United States Patent
Ohno et al.

(10) Patent No.: US 7,897,238 B2
(45) Date of Patent: Mar. 1, 2011

(54) HONEYCOMB STRUCTURE AND METHOD FOR MANUFACTURING HONEYCOMB STRUCTURE

(75) Inventors: Kazushige Ohno, Ibi-gun (JP); Masafumi Kunieda, Ibi-gun (JP); Masatoshi Okuda, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 119 days.

(21) Appl. No.: 12/033,613

(22) Filed: Feb. 19, 2008

(65) Prior Publication Data

US 2008/0241501 A1 Oct. 2, 2008

(30) Foreign Application Priority Data

Mar. 30, 2007 (JP) ............... PCT/JP2007/057304

(51) Int. Cl.
*B32B 3/12* (2006.01)
*B01D 39/14* (2006.01)

(52) U.S. Cl. ................. 428/116; 428/117; 55/524

(58) Field of Classification Search .......... 428/116
See application file for complete search history.

(56) References Cited

U.S. PATENT DOCUMENTS

| | | | |
|---|---|---|---|
| 5,914,187 A | 6/1999 | Naruse et al. | |
| 6,669,751 B1 | 12/2003 | Ohno et al. | |
| 6,984,253 B2 * | 1/2006 | Ichikawa et al. | ............ 55/484 |
| 7,112,233 B2 | 9/2006 | Ohno et al. | |
| 7,309,370 B2 | 12/2007 | Kudo et al. | |
| 2003/0138596 A1 | 7/2003 | Harada et al. | |
| 2004/0161596 A1 | 8/2004 | Taoka et al. | |
| 2004/0244344 A1 | 12/2004 | Ichikawa | |
| 2005/0016140 A1 * | 1/2005 | Komori et al. | ............ 55/523 |
| 2005/0109023 A1 | 5/2005 | Kudo et al. | |
| 2005/0153099 A1 | 7/2005 | Yamada | |
| 2005/0160710 A1 | 7/2005 | Taoka et al. | |
| 2005/0161849 A1 | 7/2005 | Ohno et al. | |
| 2005/0169819 A1 | 8/2005 | Shibata | |
| 2005/0175514 A1 | 8/2005 | Ohno | |
| 2005/0178098 A1 | 8/2005 | Ono et al. | |
| 2005/0180898 A1 | 8/2005 | Yamada | |

(Continued)

FOREIGN PATENT DOCUMENTS

EP 1142619 10/2001

(Continued)

*Primary Examiner*—Gordon R Baldwin
(74) *Attorney, Agent, or Firm*—Ditthavong Mori & Steiner, P.C.

(57) ABSTRACT

A honeycomb structure includes a plurality of pillar-shaped honeycomb fired bodies bound with one another by interposing a adhesive layer. Each of the honeycomb fired bodies has a large number of cells longitudinally placed in parallel with one another with a cell wall therebetween. An adhesive strength A between central portion honeycomb fired bodies out of the honeycomb fired bodies measured by a three-point bending strength test is at least about 0.02 and at most about 0.2 MPa. The central portion honeycomb fired bodies are positioned at a central portion of a cross-section formed by cutting the honeycomb structure perpendicularly to the longitudinal direction. The adhesive strength A is lower than an adhesive strength B between peripheral portion honeycomb fired bodies out of the honeycomb fired bodies measured by the three-point bending strength test. The peripheral portion honeycomb fired bodies form a part of a periphery the honeycomb structure.

18 Claims, 4 Drawing Sheets

U.S. PATENT DOCUMENTS

| | | |
|---|---|---|
| 2005/0229565 A1 | 10/2005 | Yoshida |
| 2005/0247038 A1 | 11/2005 | Takahashi |
| 2005/0272602 A1 | 12/2005 | Ninomiya |
| 2006/0021310 A1 | 2/2006 | Ohno et al. |
| 2006/0051556 A1 | 3/2006 | Ohno et al. |
| 2006/0166820 A1 | 7/2006 | Ogyu et al. |
| 2006/0210765 A1 | 9/2006 | Ohno et al. |
| 2006/0213163 A1 | 9/2006 | Taoka et al. |
| 2006/0216466 A1 | 9/2006 | Yoshida |
| 2006/0216467 A1 | 9/2006 | Yoshida |
| 2006/0222812 A1* | 10/2006 | Koyama et al. ............ 428/116 |
| 2006/0225390 A1 | 10/2006 | Yoshida |
| 2006/0228521 A1 | 10/2006 | Ohno et al. |
| 2006/0230732 A1 | 10/2006 | Kunieda |
| 2006/0254231 A1 | 11/2006 | Hayashi et al. |
| 2007/0020155 A1 | 1/2007 | Ohno et al. |
| 2007/0028575 A1 | 2/2007 | Ohno et al. |
| 2007/0044444 A1 | 3/2007 | Oshimi |
| 2007/0065348 A1 | 3/2007 | Ohno et al. |
| 2007/0068128 A1 | 3/2007 | Oshimi et al. |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0169453 A1 | 7/2007 | Hayakawa |
| 2007/0178275 A1 | 8/2007 | Takahashi |
| 2007/0190289 A1 | 8/2007 | Fujita |
| 2007/0190350 A1 | 8/2007 | Ohno et al. |
| 2007/0196620 A1 | 8/2007 | Ohno et al. |
| 2007/0204580 A1 | 9/2007 | Kunieda |
| 2007/0212517 A1 | 9/2007 | Ohno et al. |
| 2007/0293392 A1 | 12/2007 | Ohno et al. |
| 2008/0202086 A1 | 8/2008 | Ohno et al. |
| 2008/0202087 A1 | 8/2008 | Ohno et al. |
| 2008/0203626 A1 | 8/2008 | Ohno et al. |
| 2008/0236394 A1 | 10/2008 | Ohno et al. |
| 2008/0237941 A1 | 10/2008 | Ohno et al. |
| 2008/0241501 A1 | 10/2008 | Ohno et al. |
| 2008/0286523 A1 | 11/2008 | Ohno et al. |

FOREIGN PATENT DOCUMENTS

| | | |
|---|---|---|
| EP | 1707546 | 10/2006 |
| EP | 1728544 | 12/2006 |
| JP | 2002-253916 | 9/2002 |
| JP | 2003-117320 | 4/2003 |
| JP | 2004-154718 | 6/2004 |
| JP | 2005-154202 | 6/2005 |

* cited by examiner

A-A line cross-sectional view

500
HONEYCOMB STRUCTURE AND METHOD FOR MANUFACTURING HONEYCOMB STRUCTURE

CROSS-REFERENCE TO RELATED APPLICATIONS

This present application claims priority under 35 U.S.C. §119 to PCT Application No. PCT/JP2007/057304, filed Mar. 30, 2007, the contents of which are incorporated herein by reference in their entirety.

BACKGROUND OF THE INVENTION

1. Field of the Invention

The present invention relates to a honeycomb structure and a method for manufacturing the honeycomb structure.

2. Discussion of the Background

There has been known, as an exhaust gas purification filter or a catalyst carrier, an aggregated type honeycomb structure formed by a combination of plural pillar-shaped honeycomb fired bodies, each of the honeycomb fired bodies having a large number of cells longitudinally placed in parallel with one another (for example, refer to JP-A 2005-154202). In the aggregated type honeycomb structure of this kind, an adhesive layer is formed on a side face of each honeycomb fired body, and the honeycomb fired bodies are adhered to one another by interposing the above-mentioned adhesive layer.

In the honeycomb structure of this kind, in order to prevent collapse of the structure of the honeycomb structure having the honeycomb fired bodies bound with one another, the honeycomb fired bodies are firmly adhered to one another.

The contents of JP-A 2005-154202 are incorporated herein by reference in their entirety.

SUMMARY OF THE INVENTION

According to one aspect of the present invention, a honeycomb structure includes a plurality of pillar-shaped honeycomb fired bodies bound with one another by interposing an adhesive layer. Each of the honeycomb fired bodies has a large number of cells longitudinally placed in parallel with one another with a cell wall therebetween. An adhesive strength A between central portion honeycomb fired bodies out of the honeycomb fired bodies measured by a three-point bending strength test is at least about 0.02 and at most about 0.2 MPa. The central portion honeycomb fired bodies are positioned at a central portion of a cross-section formed by cutting the honeycomb structure perpendicularly to the longitudinal direction. The adhesive strength A is lower than an adhesive strength B between peripheral portion honeycomb fired bodies out of the honeycomb fired bodies measured by the three-point bending strength test. The peripheral portion honeycomb fired bodies form a part of a periphery the honeycomb structure at a peripheral portion of the honeycomb structure.

In the above-mentioned honeycomb structure, desirably, a difference between the adhesive strength A between the central portion honeycomb fired bodies measured by the three-point bending strength test and the adhesive strength B between the peripheral portion honeycomb fired bodies measured by the three-point bending strength test is at least about 0.02 and at most about 0.2 MPa.

Also, in the above-mentioned honeycomb structure, desirably, either one end portion of each of the cells is sealed.

Further, in the above-mentioned honeycomb structure, desirably, the adhesive layer includes, as a main component, a combination of inorganic fibers and an inorganic binder, a combination of inorganic particles and the inorganic binder, or a combination of the inorganic fibers, the inorganic particles and the inorganic binder.

In the above-mentioned honeycomb structure, desirably, the adhesive strength of the adhesive layer between the central portion honeycomb fired body and the peripheral portion honeycomb fired body is the same as the adhesive strength A between the central portion honeycomb fired bodies, or the same as the adhesive strength B between the peripheral portion honeycomb fired bodies, or in the middle of the adhesive strength A and the adhesive strength B.

Moreover, desirably, the above-mentioned honeycomb structure includes a ceramic block provided by cutting a peripheral portion of a laminated body of the honeycomb fired bodies, and a sealing material layer formed on the periphery of the ceramic block by using a sealing material paste.

Further, desirably, the above-mentioned honeycomb structure includes honeycomb fired bodies bound to one another by interposing the adhesive layer, each of the honeycomb fired bodies having a wall part in a portion corresponding to the periphery.

Desirably, the above-mentioned honeycomb further includes a catalyst supporting layer, and a catalyst supported on a surface of the catalyst supporting layer.

Here, the catalyst may include a noble metal, an alkali metal, an alkaline-earth metal, or an oxide catalyst. Also, the catalyst supporting layer may be formed of alumina, titania, zirconia, or silica.

Moreover, desirably, the above-mentioned honeycomb structure further includes a sealing material layer formed on the periphery thereof.

Furthermore, in the above-mentioned honeycomb structure, desirably, a main component of the constituting materials of the honeycomb structure includes silicon carbide or silicon-containing silicon carbide.

According to another aspect of the present invention, a method for manufacturing a honeycomb structure includes providing a plurality of pillar-shaped honeycomb fired bodies each having a large number of cells longitudinally placed in parallel with one another with a cell wall therebetween, and adhering the honeycomb fired bodies to one another by interposing an adhesive layer. The adhesive layer for adhering central portion honeycomb fired bodies is formed by using an adhesive paste which has been adjusted to have the adhesive strength, measured by a three-point bending strength test, of at least about 0.02 Mpa and at most about 0.2 Mpa. The adhesive layer for adhering peripheral portion honeycomb fired bodies is formed by using an adhesive paste which has been adjusted to have the higher adhesive strength than the adhesive layer for adhering central portion honeycomb fired bodies.

Desirably, the above-mentioned method for manufacturing a honeycomb structure further includes: placing the honeycomb fired bodies to be inclined on a base with an upper portion having a V-shaped cut surface which allows lamination of the honeycomb fired bodies being inclined; applying the adhesive paste to be the adhesive layer on two side faces facing upward so as to form an adhesive paste layer; and repeating lamination of another honeycomb fired body on the adhesive paste layer to manufacture a large pillar-shaped laminated body of the honeycomb fired bodies having a predetermined size.

Here, the above-mentioned method for manufacturing a honeycomb structure may further include cutting the peripheral portion of the laminated body of the honeycomb fired bodies to manufacture a ceramic block may be carried out. In this case, a sealing material layer may be further formed on the periphery of the ceramic block by using the sealing material paste.

In the above-mentioned method for manufacturing a honeycomb structure, desirably, the honeycomb fired bodies are bonded to one another by interposing the adhesive layer, each of the honeycomb fired bodies having a wall part in a portion corresponding to the periphery.

Here, the above-mentioned method for manufacturing a honeycomb structure may further include forming the sealing material layer on the periphery of the honeycomb structure.

In the above-mentioned method for manufacturing a honeycomb structure, desirably, a difference between the adhesive strength A between the central portion honeycomb fired bodies measured by the three-point bending strength test and the adhesive strength B between the peripheral portion honeycomb fired bodies measured by the three-point bending strength test is at least about 0.02 Mpa and at most about 0.2 MPa.

Also, desirably, the above-mentioned method for manufacturing a honeycomb structure further includes sealing either one of the ends of the cell.

Moreover, in the above-mentioned method for manufacturing a honeycomb structure, desirably, the adhesive layer includes a combination of inorganic fibers and an inorganic binder, a combination of inorganic particles and the inorganic binder, or a combination of the inorganic fibers, the inorganic particles and the inorganic binder as a main component.

Here, in the above-mentioned method for manufacturing a honeycomb structure, desirably, the combination of the inorganic fibers and the inorganic binders includes at least about 70% by weight and at most about 95% of the inorganic fibers relative to at least about 5% by weight and at most about 30% by weight of a solid content of the inorganic binder, the combination of the inorganic particles and the inorganic binders includes at least about 70% by weight and at most about 95% of the inorganic particles relative to at least about 5% by weight and at most about 30% by weight of a solid content of the inorganic binder, or the combination of the inorganic fibers, the inorganic particles and the inorganic binders includes at least about 30% by weight and at most about 60% by weight of the inorganic fibers and at least about 35% by weight and at most about 65% by weight of the inorganic particles relative to at least about 5% by weight and at most about 30% by weight of a solid content of the inorganic binder.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENT

Figure 1A:
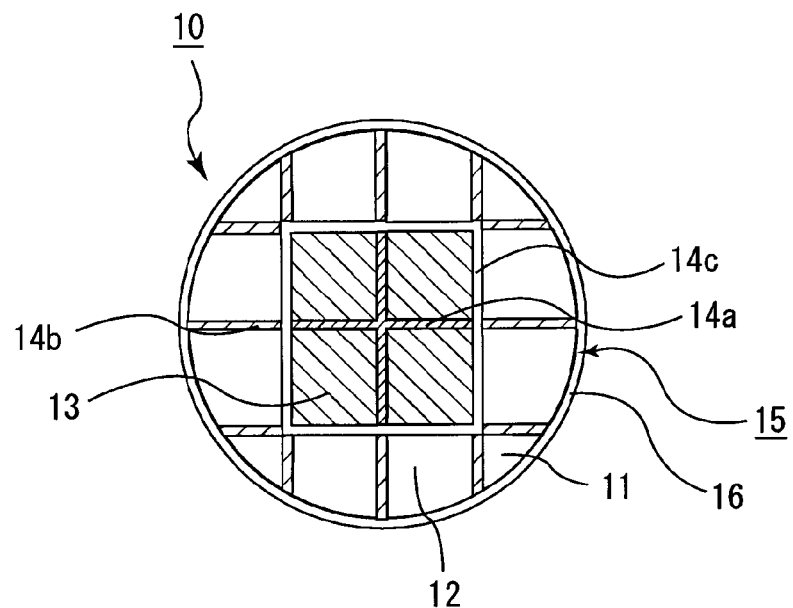
FIG. 1A is a vertical cross-sectional view showing one embodiment of the honeycomb structure of the present invention.

The embodiments will now be described with reference to the accompanying drawings, wherein like reference numerals designate corresponding or identical elements throughout the various drawings.

Namely, the honeycomb structure according to an embodiment of the present invention 1 is a honeycomb structure including a plurality of pillar-shaped honeycomb fired bodies bound with one another by interposing an adhesive layer, each of the honeycomb fired bodies having a large number of cells longitudinally placed in parallel with one another with a cell wall therebetween, wherein an adhesive strength A between central portion honeycomb fired bodies out of the honeycomb fired bodies measured by a three-point bending strength test is at least about 0.02 and at most about 0.2 MPa, the central portion honeycomb fired bodies being positioned at a central portion of a cross-section formed by cutting the honeycomb structure perpendicularly to the longitudinal direction, and wherein the adhesive strength A is lower than an adhesive strength B between peripheral portion honeycomb fired bodies out of the honeycomb fired bodies measured by the three-point bending strength test, the peripheral portion honeycomb fired bodies forming a part of a periphery the honeycomb structure at a peripheral portion of the honeycomb structure.

In the honeycomb structure according to the embodiment of the present invention, the adhesive strength A between the central portion honeycomb fired bodies is lower than the adhesive strength B between the peripheral portion honeycomb fired bodies.

In the regeneration process of the honeycomb structure, since the central portion of the honeycomb structure, compared with the peripheral portion thereof, tends to reach a high temperature, it is expected that the central portion receives greater thermal stress than the peripheral portion. However, since the honeycomb structure according to the embodiment of the present invention is designed to have low adhesive strength A between the central portion honeycomb fired bodies, it becomes easier to alleviate thermal stress to be imposed on the central portion honeycomb fired body by the adhesive layer and also to prevent cracks from occurring in the central portion of the honeycomb structure.

Further, the honeycomb structure according to the embodiment of the present invention is designed to have high adhesive strength B between the peripheral portion honeycomb fired bodies, and the peripheral portion honeycomb fired bodies are adhered to one another with a sufficient adhesive strength to maintain the structure of the honeycomb structure. As a result, collapse of the structure of the honeycomb structure or displacement of the position of the honeycomb fired bodies tend not to occur.

Furthermore, since the adhesive strength A between the central portion honeycomb fired bodies is about 0.02 MPa or more, the central portion honeycomb fired body is not allowed to easily escape from the honeycomb structure. Moreover, since the above-mentioned adhesive strength A is about 0.2 or less MPa, the thermal stress to be imposed on the central portion honeycomb fired body is allowed to be easily distributed, thereby preventing occurrences of cracks and the like.

Namely, unlike the conventional honeycomb structure in which all the honeycomb fired bodies are uniformly adhered to one another with an high adhesive strength, the honeycomb structure according to the embodiment of the present invention is designed to have a difference between the adhesive strength between the peripheral portion honeycomb fired bodies and the adhesive strength between the central portion honeycomb fired bodies, so that it is possible to provide a honeycomb structure which is formed with a sufficient adhesive strength for maintenance of the structure thereof and allows no cracks to occur in the regeneration process.

As disclosed in JP-A 2005-154202, in a case where the aggregated type honeycomb structure having the honeycomb fired bodies firmly adhered to one another is used as an exhaust gas purification filter, it has been a problem that cracks due to thermal stress imposed in a regeneration process may occur in the central part of the honeycomb structure.

In the honeycomb structure according to the embodiment of the present invention, a difference (B–A) between the adhesive strength A between the central portion honeycomb fired bodies measured by the 3-point bending strength test and the adhesive strength B between the peripheral portion honeycomb fired bodies measured by the 3-point bending strength test is at least about 0.02 and at most about 0.2 MPa.

In the honeycomb structure according to the embodiment of the present invention, the difference (B–A) between the adhesive strengths is within the above-mentioned range, so that thermal stress is distributed to the central portion and adhesive layers neighborhood thereof, thereby preventing occurrences of cracks and the like in the regeneration process.

In a case where the difference (B–A) between the adhesive strengths is about 0.02 Mpa or more, cracks tend not to occur due to the large difference thereof. On the other hand, in a case where the difference (B–A) between the adhesive strengths is about 0.2 Mpa or less, the adhesive strength in the peripheral portion is not too strong and thus stress concentration tends not to occur in the peripheral portion, thereby hardly causing cracks.

In the honeycomb structure according to the embodiment of the present invention, either one end portion of each of the above-mentioned cells is sealed, and thereby the honeycomb structure functions as an exhaust gas purification filter for removing particulates and the like in exhaust gases from vehicles.

Since the honeycomb structure according to the embodiment of the present invention includes, as a main component of the above-mentioned adhesive layer, a combination of inorganic fibers and an inorganic binder, a combination of inorganic particles and the inorganic binder or a combination of the inorganic fibers, the inorganic particles and the inorganic binder, in case of the adhesive layer formed therein, it becomes easy to alleviate stress and more difficult to generate cracks and the like.

First Embodiment

Hereinafter, referring to drawings, the first embodiment that is one embodiment of the present invention will be described.

Figure 1B:
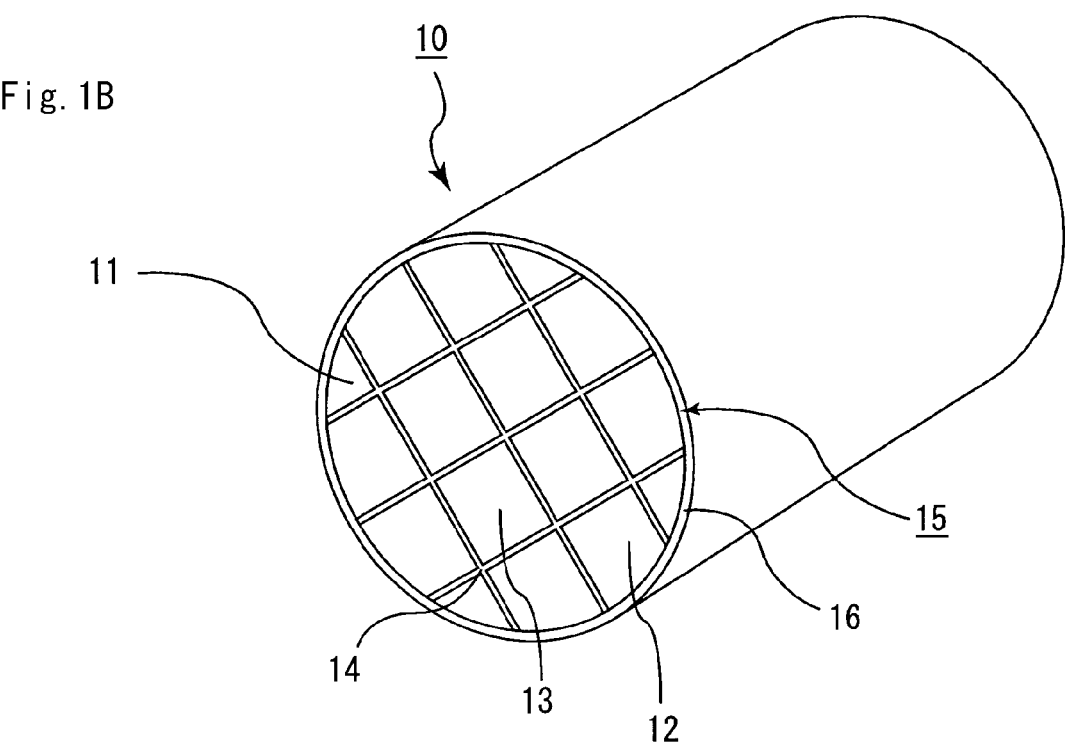
FIG. 1B is a perspective view of the honeycomb structure.
Figure 2A:
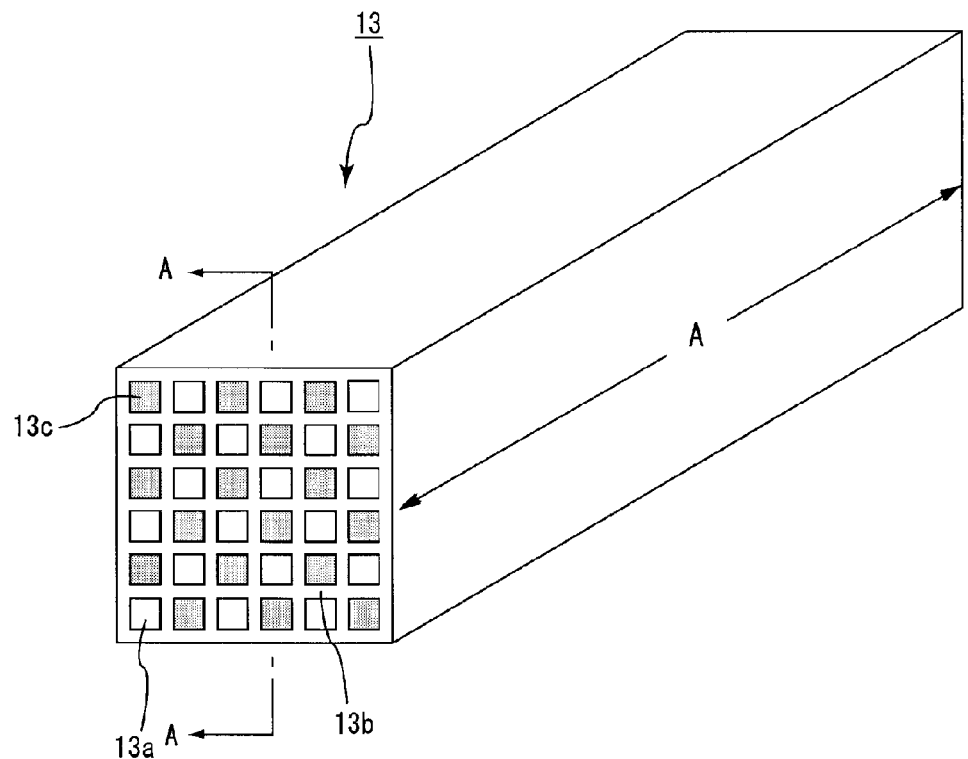
FIG. 2A is a perspective view showing a honeycomb fired body forming the honeycomb structure shown in FIGS. 1A and 1B.

FIG. 1A is a longitudinal cross-sectional view that schematically shows one embodiment of the honeycomb structure of the present invention, and FIG. 1B is a perspective view of the honeycomb structure. FIG. 2A is a perspective view that shows the honeycomb fired body 13 forming the honeycomb structure illustrated in FIGS. 1A and 1B, and FIG. 2B is an A-A line cross-sectional view thereof.

In the honeycomb structure 10 according to the present embodiment, a plurality of honeycomb fired bodies 11, 12, and 13 including the honeycomb fired body 13 shown in FIG. 2A are bound to one another by interposing an adhesive layer 14 to form a ceramic block 15. Furthermore, a seal material layer 16 is formed on the periphery of the ceramic block 15.

Figure 2B:
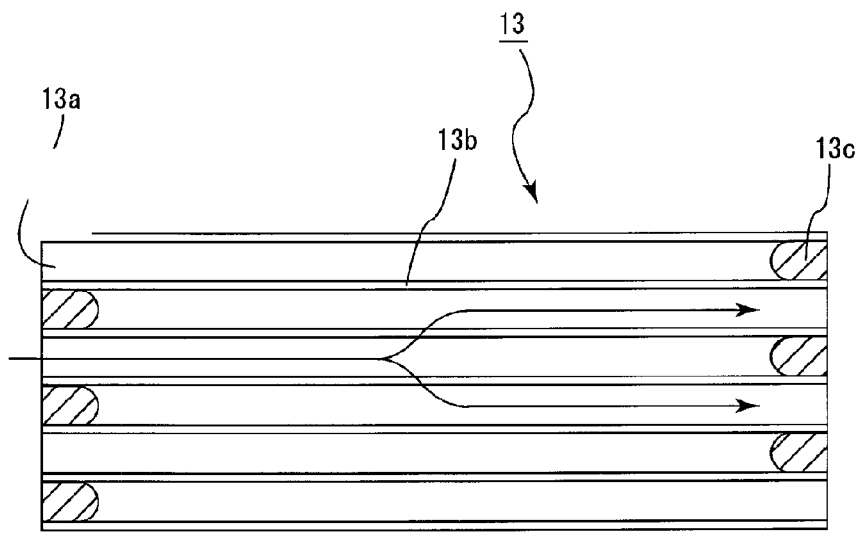
FIG. 2B is a cross-sectional view taken along line A-A of the honeycomb fired body shown in FIG. 2A.

Although only the outline of the honeycomb fired bodies 11, 12, and 13 is shown in FIGS. 1A and 1B, the honeycomb fired body 13 and the like, which form the honeycomb structure 10, have a large number of cells 13a longitudinally placed in parallel with one another and the cell wall 13b separating cells 13a, as shown in FIG. 2B, so as to function as a filter.

As shown in FIG. 2B, each of the cells 13a, formed in the honeycomb fired body 13, is sealed with a plug 13c at either one of the ends on its exhaust-gas inlet side and outlet side so that exhaust gases that have flowed into one cell 13a is discharged from another cell 13a after having always passed through the cell wall 13b that separates the cells 13a; thus, when the exhaust gases pass through the cell wall 13b, particulates are captured by the cell wall 13b portion so that the exhaust gases are purified. Here, the honeycomb fired body 13 has a square-pillar shape, as shown in FIG. 2A, and the honeycomb fired bodies 11 and 12 are manufactured by cutting the honeycomb fired body 13.

In the honeycomb structure of the present invention, the central portion refers to a portion neighborhood of the center on a cross-section formed by cutting the honeycomb structure perpendicularly to the longitudinal direction.

Therefore, in the honeycomb structure 10 having a total of 16 pieces of honeycomb fired bodies 11, 12, and 13 bound by 4×4 pcs in lengthwise and breadthwise, the central portion honeycomb fired bodies refers to four honeycomb fired bodies 13 positioned at the upper right, the lower right, the central upper left, and the central lower left from the center of the cross-section formed by cutting the honeycomb structure perpendicularly to the longitudinal direction thereof, as shown in FIG. 1A.

Moreover, the peripheral portion honeycomb fired bodies forming a part of the periphery of the honeycomb structure refer to 12 pieces of honeycomb fired bodies 11 and 12 which are in contact with the seal material layer 16 formed in the peripheral portion in FIG. 1A.

Therefore, the adhesive strength A between central portion honeycomb fired bodies refers to an adhesive strength between the honeycomb fired bodies 13 adhered by the adhesive layer 14a, and the adhesive strength B between the peripheral portion honeycomb fired bodies refers to an adhesive strength between the honeycomb fired bodies 11 and 12 or the honeycomb fired bodies 12 and 12 adhered by an adhesive layer 14b.

Figure 3:
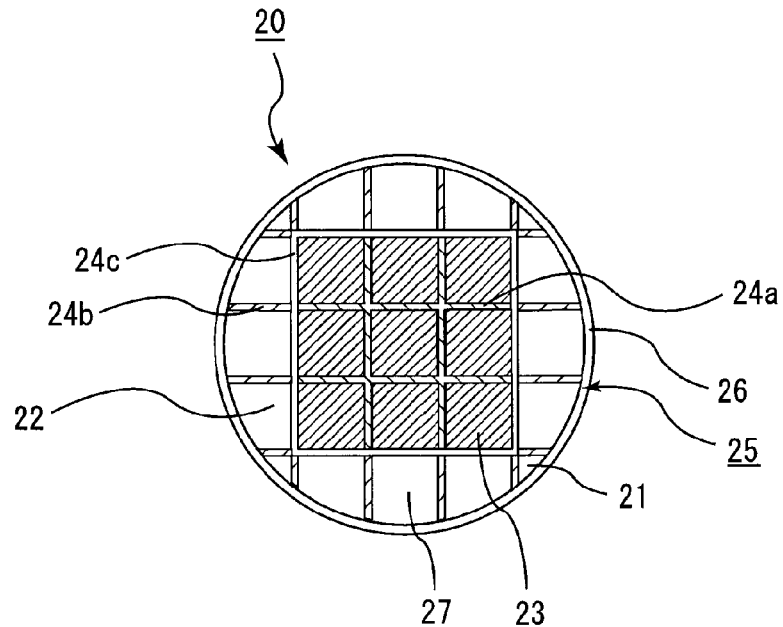
FIG. 3 is a vertical cross-sectional the honeycomb structure 20 having a total of 25 honeycomb fired bodies 21, 22, 23 and 27 bound by 5×5 pcs in lengthwise and breadthwise.

FIG. 3 is a longitudinal cross-sectional view of the honeycomb structure 20 having a total of 25 pieces of honeycomb fired bodies 21, 22, 23 and 27 bound by 5×5 pcs in lengthwise and breadthwise.

The central portion honeycomb fired bodies in the honeycomb structure 20 of this kind refer to a honeycomb fired body 23 positioned at the center of the cross-section and eight honeycomb fired bodies in the above, the below, the left, the right, the upper right, the lower right, the upper left, and the lower left from this honeycomb fired body, that is, a total of nine honeycomb fired bodies.

Here, a numeral number 25 in FIG. 3 indicates the ceramic block.

Moreover, in FIG. 3, the peripheral portion honeycomb fired bodies forming a part of the periphery refer to 16 pieces of honeycomb fired bodies 21, 22 and 27 which are in contact with the seal material layer 26 formed in the peripheral portion.

Therefore, the adhesive strength A between the central portion honeycomb fired bodies refers to an adhesive strength between honeycomb fired bodies 23 adhered by an adhesive layer 24a, and the adhesive strength B between the peripheral portion honeycomb fired bodies refers to an adhesive strength between the honeycomb fired bodies 21 and 22 or the honeycomb fired bodies 22 and 27 adhered by an adhesive layer 24b.

Based on the above, in a case where the number of the honeycomb fired bodies bound together is comprised of even×even pcs, even in a honeycomb structure having more than 16 honeycomb fired bodies, four honeycomb fired bodies belong to the central portion honeycomb fired bodies like the honeycomb structure in which the number of the honeycomb fired bodies bound together is comprised of 4×4 in lengthwise and breadthwise. In a case where the number of the honeycomb fired bodies bound together is comprised of odd×odd pcs, even in a honeycomb structure having more than 25 honeycomb fired bodies, nine honeycomb fired bodies belong to the central portion honeycomb fired bodies like the honeycomb structure in which the number of the honeycomb fired bodies bound together is comprised of 5×5 in lengthwise and breadthwise.

The adhesive strength A between the central portion honeycomb fired bodies refers to an adhesive strength measured by the three-point bending test on two arbitrary honeycomb fired bodies neighboring each other out of these four or nine honeycomb fired bodies, as described above.

Moreover, as described above, the peripheral portion honeycomb fired bodies refer to honeycomb fired bodies forming a part of the periphery of the honeycomb structure, regardless the number of the honeycomb fired bodies forming the honeycomb structure. The adhesive strength B between the peripheral portion honeycomb fired bodies refers to the adhesive strength measured by the three-point bending test on two arbitrary peripheral portion honeycomb fired bodies neighboring each other.

The above-mentioned adhesive strength can be measured by the three-point bending test according to JIS R 1601.

That is, a sample is cut out from a manufactured honeycomb structure to have an adhesive layer vertically positioned in the middle portion thereof and honeycomb fired bodies positioned on the opposite sides of the adhesive layer, and a loaded point is set to be on a part of the adhesive layer, and then three-point bending is carried out.

Three-point bending strength is calculated by the following equation (1).

$$\sigma = 3P(L-L_1)/2Bh^2 \quad (1)$$

In the equation (1), σ denotes three-point bending strength, P denotes load, $L-L_1$ denotes distance between fulcrums, B denotes a width of the sample, and h denotes a thickness (height) of the sample.

The content of JIS R 1601 is incorporated herein by reference in its entirety.

The main component of the adhesive layer to adhere the honeycomb fired bodies according to the embodiments of the present invention includes a combination of inorganic fibers and an inorganic binder, a combination of inorganic particles and the inorganic binder, or a combination of the inorganic fibers, the inorganic particles and the inorganic binder.

With respect to a content of each constituent, in a case where a combination of the inorganic fibers and the inorganic binder, or a combination of the inorganic particles and the inorganic binder is included as the main component, the amount of the inorganic fibers or the inorganic particles to at least about 5% by weight and at most about 30% by weight of a solid content of the inorganic binder is preferably at least about 70% by weight and at most about 95% by weight. In a case where the inorganic fibers, inorganic particles, and an inorganic binder are included as the main component, the amount of the inorganic particles and the inorganic fibers to at least about 35% by weight and at most about 65% by weight of a solid content of the inorganic binder is preferably at least about 35% by weight and at most about 65% by weight and at least about 30% by weight and at most about 60% by weight, respectively.

The above-mentioned adhesive layer may contain the organic binder. However, in case of using the honeycomb structure as an exhaust gas filter for vehicles, the temperature thereof rises so high that the organic binder is easily decomposed and disappeared, leading to fluctuation of the adhesive strength. Therefore, the organic binder is desirably contained in as small an amount as possible.

With respect to the inorganic binder, examples thereof include silica sol, alumina sol and the like. Each of these may be used alone, or two or more kinds of these may be used in combination. Out of the inorganic binders, silica sol is more desirably used.

With respect to the inorganic fibers, examples thereof include ceramic fibers such as silica-alumina, mullite, alumina, silica and the like. Each of these may be used alone, or two or more kinds of these may be used in combination. Out of the inorganic fibers, alumina fibers are more desirably used.

With respect to the inorganic particles, examples thereof include carbides, nitrides and the like, and specific examples thereof include inorganic powder made of silicon carbide, silicon nitride, boron nitride and the like. Each of these may be used alone, or two or more kinds of these may be used in combination. Out of the inorganic fine particles, silicon carbide is desirably used due to its superior thermal conductivity.

The adhesive strength between the adhesive layer and the honeycomb fired body seems to be influenced by composition or a content of the inorganic binder, composition of the inorganic particles or the inorganic fiber, and a density of an adhesive agent.

Moreover, in order to adjust the adhesive strength between the honeycomb fired bodies, a pore-forming agent, such as balloons that are fine hollow spheres or spherical acrylic particles, graphite and the like, may be added. This is because voids are formed in the adhesive layer.

Although the balloons is not particularly limited, examples thereof include alumina balloons, glass micro-balloons, shirasu balloons, fly ash balloons (FA balloons), mullite balloons and the like. Out of these, fly ash balloons are more preferably used.

The adhesive layer preferably has a thickness of at least about 0.5 and at most about 2.0 mm.

In a case where the seal material layer has a thickness of about 0.5 mm or more, the adhesive strength is less likely to fall significantly. On the other hand, in a case where the seal material layer has a thickness of about 2.0 mm or less, an aperture ratio of the cells tends not to be reduced, and thus the function in case of using the honeycomb structure as an exhaust gas filter is less likely to be reduced. Moreover, pressure loss tends not to be large in a case where the seal material layer has a thickness of about 2.0 mm or less.

Next, the following description will discuss a method for manufacturing the honeycomb structure by bonding a plurality of honeycomb fired bodies.

Figure 4:
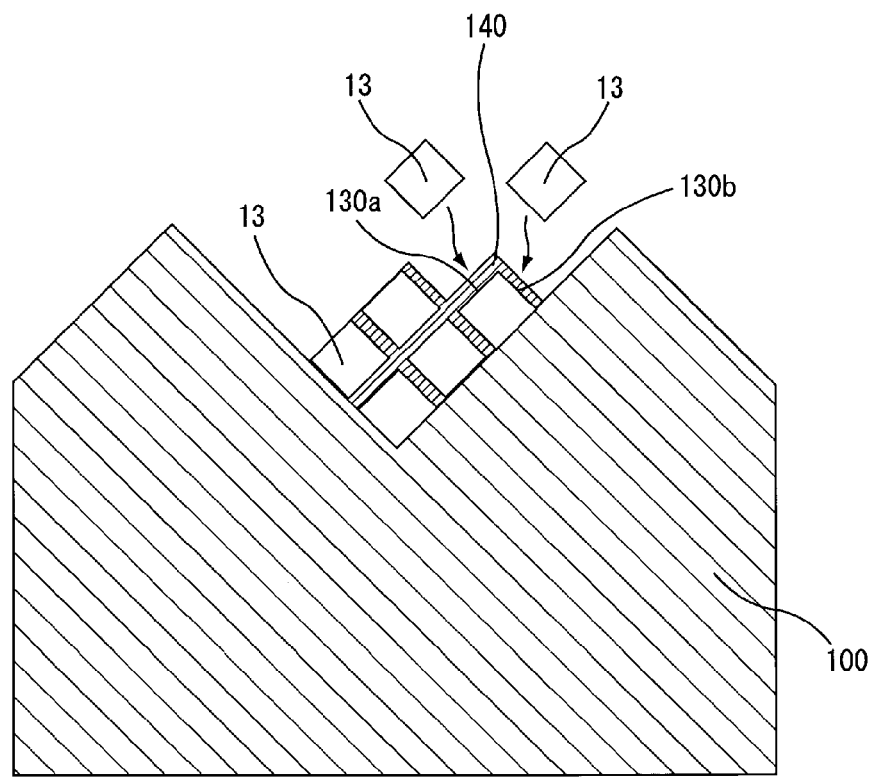
FIG. 4 is an explanatory view showing how to manufacture a large pillar-shaped laminated body formed by a plurality of honeycomb fired bodies 13 bound with one another using an adhesive paste layer.

FIG. 4 is a diagram showing a method for manufacturing a large square-pillar shaped laminated body of the honeycomb fired bodies 13 by bonding a plurality of the honeycomb fired body using an adhesive paste layer.

In order to manufacture the honeycomb structure 10 by bonding a plurality of honeycomb fired body, for example, as shown in FIG. 4, the honeycomb fired bodies 13 are placed to be inclined on a base with an upper portion having a V-shaped cut surface which allows lamination of the honeycomb fired bodies 13 being inclined. After that, the adhesive paste to be the adhesive layer 14 is applied on two side faces 130a, 130b facing upward so as to form an adhesive paste layer 140. By repeating a process of laminating another honeycomb fired body 13 on this adhesive agent paste layer 140, the large pillar-shaped laminated body of the honeycomb fired bodies 13 having a predetermined size is manufactured.

In the embodiment of the present invention, at this time, as the adhesive paste for adhering central portion honeycomb fired bodies, an adhesive paste adjusted to have the adhesive strength of about 0.02 to about 0.2 MPa is used to form an adhesive layer. On the other hand, as adhesive paste for adhering peripheral portion honeycomb fired bodies, an adhesive paste adjusted to have the higher adhesive strength than the adhesive paste layer for adhering central portion honeycomb fired bodies is used to form an adhesive layer.

The adhesive strength of the adhesive layer between the central portion honeycomb fired body and the peripheral portion honeycomb fired body (see 14c in FIG. 1A and 24c in FIG. 3), although not particularly limited, is preferably the same as the adhesive strength A of the central portion honeycomb fired bodies, the same as the adhesive strength B of the peripheral portion honeycomb fired bodies, or in the middle of the both adhesive strengths.

Next, the laminated body of the honeycomb fired bodies 13 is heated, and the adhesive paste layer 140 is dried and solidified to be the adhesive layer 14. Thereafter, the peripheral portion thereof is cut to be round pillar-shaped, as shown in FIGS. 1A and 1B, by using a diamond cutter and the like to manufacture a ceramic block 15.

Subsequently, the honeycomb structure 10 formed by a plurality of honeycomb fired bodies 11, 12, and 13 bound with one another by interposing the adhesive layer 14 is manufactured by forming the sealing layer 16 using the above-mentioned sealing material paste.

With respect to the organic binder, examples thereof may include polyvinyl alcohol, methyl cellulose, ethyl cellulose, carboxymethyl cellulose and the like.

Each of these may be used alone, or two or more kinds of these may be used in combination.

Next, all processes for manufacturing the above-mentioned honeycomb structure will be described.

First, silicon carbide powders having different average particle diameters is dry-mixed with an organic binder to prepare mixed powder, and a liquid-state plasticizer, a lubricant and water are mixed to prepare a mixed liquid, and the mixed powder and the mixed liquid are mixed by using a wet mixer to prepare a wet mixture to be used for molding.

Although the particle diameter of the above-mentioned silicon carbide powder is not particularly limited, it is desirable to use the silicon carbide powder that tends not to cause the case where the size of the honeycomb fired body manufactured by the following firing treatment becomes smaller than that of the honeycomb molded body. For example, it is preferable to use a combination of 100 parts by weight of the powder having an average particle diameter of at least about 0.1 μm and at most about 50.0 μm with at least about 5 parts by weight and at most about 65 parts by weight of the powder having an average particle diameter of at least about 0.1 μm and at most about 1.0 μm.

The wet mixture is loaded into an extrusion-molding machine.

The wet mixture loaded in the extrusion molding machine is formed into a honeycomb molded body having a predetermined shape by extrusion molding. The honeycomb molded body is dried by a drying apparatus to obtain a dried honeycomb molded body.

Next, a predetermined amount of plug material paste to form plugs is filled into end portions on a gas outlet side of gas inlet side cells as well as into end portions on a gas inlet side of gas outlet side cells so that the cells are sealed.

Upon sealing the cells, the sealing material paste is filled into only cells which need to be sealed, by placing a mask for sealing on the end face (the cross-section after the cutting process) of the honeycomb molded body.

A cell-sealed honeycomb molded body is manufactured through such processes.

Next, a degreasing process is carried out for heating an organic matter in the cell-sealed honeycomb molded body. The obtained cell-sealed honeycomb degreased body is carried into a firing furnace, and a firing process is carried out thereon to manufacture a honeycomb fired body.

Afterward, an adhesive paste adjusted to have a predetermined strength is applied onto the side faces of the honeycomb fired body to form an adhesive paste layer having a predetermined thickness. By repeating a process for laminating another honeycomb fired bodies thereon to manufacture a large rectangular pillar-shaped laminated body of the honeycomb fired bodies 13 having a predetermined size, and then the obtained laminated body is dried and cut into a round pillar shape to manufacture a honeycomb structure.

The following description will discuss the functions and effects of the honeycomb structure of the present embodiment.

(1) In the regeneration process of the honeycomb structure, since the central portion of the honeycomb structure, compared with the peripheral portion thereof, tends to reach a high temperature, it is expected that the central portion receives greater thermal stress than the peripheral portion. However, since the honeycomb structure according to the first embodiment is designed to have the adhesive strength A between the central portion honeycomb fired bodies as low as about 0.02 to about 0.2 MPa in the honeycomb structure, it is possible to alleviate the thermal stress to be imposed on the central portion honeycomb fired body by the adhesive layer, making it easier to prevent cracks from occurring in the central portion of the honeycomb structure.

(2) Furthermore, the honeycomb structure according to the first embodiment is designed to have the higher adhesive strength B between the peripheral portion honeycomb fired bodies than the adhesive strength A between the central portion honeycomb fired bodies, and a sufficient adhesive strength between the peripheral honeycomb fired bodies to maintain the structure of the honeycomb structure. As a result, collapse of the structure of the honeycomb structure or displacement of the position of the honeycomb fired bodies becomes less likely to occur.

(3) Since the adhesive strength A between the central portion honeycomb fired bodies is about 0.02 MPa or more, the central portion honeycomb fired bodies are not allowed to easily escape from the honeycomb structure. Since the above-mentioned adhesive strength A is about 0.2 MPa or less, the thermal stress to be imposed on the central portion honeycomb fired bodies is easily distributed, thereby preventing occurrences of cracks and the like.

EXAMPLES

The following description will discuss examples which more specifically disclose the first embodiment of the present invention. However, the present invention is not limited only to those examples.

In the following Examples and Comparative Examples, honeycomb structured bodies were manufactured by the method according to the above-mentioned embodiment and the conventional method, and the adhesive strength A between the central portion honeycomb fired bodies and the adhesive strength B between the peripheral portion honeycomb fired bodies of each of the obtained honeycomb structured bodies were measured by the three-point bending test according to JIS R 1601. Moreover, durability over cycle operation (thermal shock) was examined.

Example 1

An amount of 52.8% by weight of a coarse powder of silicon carbide with an average particle diameter of 22 μm and 22.6 % by weight of a fine powder of silicon carbide with an average particle diameter of 0.5 μm are wet mixed, and 2.1% by weight of an acrylic resin, 4.6% by weight of an organic binder (methyl cellulose), 2.8% by weight of a lubricant (UNILUBE, manufactured by NOF Corp.), 1.3% by weight of glycerin, and 13.8% by weight of water were added to the mixture and kneaded to obtain a mixture composition, and then extrusion molding is carried out to manufacture a honeycomb molded body having almost the same shape as the honeycomb fired body 13 shown in FIG. 2A without a sealed end.

(2) Next, these raw honeycomb molded bodies is cut to have a longitudinal direction length of 150 mm. Subsequently, the above-mentioned raw honeycomb molded body was dried by using a microwave drying apparatus and the like to obtain a dried body of the honeycomb molded body, and then the predetermined cells were filled with a paste having the same composition as that of the raw honeycomb molded body, and dried again by using the drying apparatus.

(3) Next, the honeycomb fired body 13 was manufactured by degreasing the dried honeycomb molded body at 400° C., and firing at 2200° C. for 3 hours under normal pressure argon atmosphere.

The manufactured honeycomb fired body 13 made of the silicon carbide fired body had a size of 34.3 mm×34.3 mm×150 mm, the number of cells 13a (cell density) of 46.5 pcs/cm$^2$, a cell wall thickness of 0.25 mm and a porosity of 45%.

(4) Moreover, as the adhesive paste for adhering the peripheral portion honeycomb fired bodies and the adhesive paste for adhering the central portion honeycomb fired bodies, a heat resistant adhesive paste a, heat resistant adhesive paste b, heat resistant adhesive paste c, heat resistant adhesive paste d and heat resistant adhesive paste e were prepared, and the respective adhesive pastes contained alumina fibers having an average fiber length of 20 μm, silicon carbide particles having an average particle diameter of 0.6 μm, silica sol (silica content in sol: 30% by weight), carboxymethyl cellulose ceramic, balloons and water in proportions shown in Table 1. These adhesive pastes were used in the present Example, and also in Examples 2 to 5 and Comparative Examples 1 to 4 described later.

TABLE 1

|  | Alumina fiber (wt %) | Silicon carbide (wt %) | Silica sol (wt %) | CMC (wt %) | Ceramic balloon (wt %) | Water (wt %) | Adhesive strength (MPa) |
|---|---|---|---|---|---|---|---|
| Sealing material paste a | 18 | 12 | 10 | 5 | 30 | 25 | 0.02 |
| Sealing material paste b | 26 | 15 | 13 | 6 | 10 | 30 | 0.10 |
| Sealing material paste c | 25 | 16 | 15 | 6 | 10 | 28 | 0.12 |
| Sealing material paste d | 30 | 21 | 15 | 6 | 0 | 28 | 0.20 |
| Sealing material paste e | 25 | 27 | 18 | 5 | 0 | 25 | 0.30 |

CMC indicates carboxymethyl cellulose.

In the present examples, using adhesive pastes shown in Table 2 as the adhesive paste for adhering the central portion honeycomb fired bodies and the adhesive paste for adhering the peripheral portion honeycomb fired bodies, the adhesive paste according to a position to be applied is applied on a side of the honeycomb fired body 13 to have the same thickness, and the honeycomb fired bodies 13 were laminated to be bound together by a method as shown in FIG. 4, so that a large square-pillar shaped laminated body of the honeycomb fired bodies 13 were manufactured and dried at 120° C. The adhesive layer has a thickness of 1.0 mm. Here, as the adhesive paste for adhering the central portion honeycomb fired body and the peripheral portion honeycomb fired body, an adhesive paste same as the adhesive paste for adhering the central portion honeycomb fired bodies was used. Also in the following Examples and Comparative Examples, the same processes were carried out.

TABLE 2

|  | Adhesion between central portion honeycomb fired bodies ||| Adhesion between peripheral portion honeycomb fired bodies ||| Durability test |
|---|---|---|---|---|---|---|---|
|  | Used adhesive paste | Adhesive strength A (MPa) | Load upon destruction (Kgf) | Used adhesive paste | Adhesive strength B (MPa) | Load upon destruction (Kgf) | result* (Existence of crack) |
| Comparative Example 1 | Adhesive paste a | 0.02 | 5.0 | Adhesive paste a | 0.02 | 5.0 | + |

TABLE 2-continued

| | Adhesion between central portion honeycomb fired bodies | | | Adhesion between peripheral portion honeycomb fired bodies | | | Durability test |
|---|---|---|---|---|---|---|---|
| | Used adhesive paste | Adhesive strength A (MPa) | Load upon destruction (Kgf) | Used adhesive paste | Adhesive strength B (MPa) | Load upon destruction (Kgf) | result* (Existence of crack) |
| Example 1 | Adhesive paste a | 0.02 | 5.0 | Adhesive paste b | 0.10 | 25.1 | − |
| Comparative Example 2 | Adhesive paste b | 0.10 | 25.1 | Adhesive paste a | 0.02 | 5.0 | + |
| Comparative Example 3 | Adhesive paste b | 0.10 | 25.1 | Adhesive paste b | 0.10 | 25.1 | + |
| Example 2 | Adhesive paste b | 0.10 | 25.1 | Adhesive paste c | 0.12 | 30.1 | − |
| Example 3 | Adhesive paste b | 0.10 | 25.1 | Adhesive paste d | 0.20 | 50.1 | − |
| Example 4 | Adhesive paste b | 0.10 | 25.1 | Adhesive paste e | 0.30 | 75.2 | − |
| Comparative Example 4 | Adhesive paste d | 0.20 | 50.1 | Adhesive paste d | 0.20 | 50.1 | + |
| Example 5 | Adhesive paste d | 0.20 | 50.1 | Adhesive paste e | 0.30 | 75.2 | − |

*+ Cracks were observed − No cracks were observed (5) Next, the round pillar-shaped ceramic block 15 was manufactured by cutting using a diamond cutter.

(6) Subsequently, seal material paste was prepared by mixing and kneading 23.3% by weight of ceramic fibers (shot content: 3%, average fiber length: 100 μm) made of alumina silicate as the inorganic fiber, 30.2% by weight of silicon carbide powders having an average particle diameter of 0.3 μm as the inorganic particle, 7% by weight of silica sol (SiO$_2$ content in sol: 30% by weight) as the inorganic binder, 0.5% by weight of carboxymethyl cellulose and 39% by weight of water.

Next, a sealing material paste layer having a thickness of 0.2 mm was formed on the peripheral portion of the ceramic block 15 using the above-mentioned sealing material paste. Then this sealing material paste layer was dried at 120° C., and the round pillar-shaped honeycomb structure 10 having a diameter and length of 143.8 mm×150 mm was manufactured.

Examples 2 to 5

Honeycomb structured bodies were manufactured in the same manner as in Example 1, except that adhesive pastes shown in Table 2 were used as the adhesive paste for adhering the central portion honeycomb fired bodies and the adhesive paste for adhering the central portion honeycomb fired bodies in (4).

Comparative Examples 1 to 4

Honeycomb structured bodies were manufactured in the same manner as in Example 1, except that adhesive pastes shown in Table 2 were used as the adhesive paste for adhering the central portion honeycomb fired bodies and the adhesive paste for adhering the central portion honeycomb fired bodies in (4).

(Measurement of the Adhesive Strength Between the Honeycomb Fired Bodies)

As described above, the adhesive strength between the honeycomb fired bodies was measured by the three-point bending test according to JIS R 1601.

That is, a sample was cut out from the manufactured honeycomb structure to have an adhesive layer vertically positioned in the middle portion thereof and honeycomb fired bodies positioned on the opposite sides of the adhesive layer, and a loaded point is set to be on a part of the adhesive layer, and then three-point bending was carried out by using an Instron tester. Bending strength was calculated based on the following equation (1).

$$\sigma = 3P(L-L_1)/2Bh^2 \quad (1)$$

In this case, the distance $(L-L_1)$ between fulcrums is 57 mm, the width B of the sample is 34.3 mm, and the thickness (height) h of the sample is 25 mm. Table 2 shows the results.

(Durability Over Cycle Operation)

First, each of the honeycomb structured bodies according to Examples 1 to 5 and Comparative Examples 1 to 4 were placed in an exhaust gas passage of an engine. Furthermore, a commercial catalyst supporting body (diameter: 144 mm, length: 100 mm, number of cells (cell density): 400 cells/inch$^2$, amount of supported platinum: 5 g/L) was installed on a position on a gas inlet side from the honeycomb structure to make them function as an exhaust gas purifying apparatus. An engine was driven for 7 hours at the number of revolutions of 3000 min$^{-1}$ and a torque of 50 Nm to capture particulates. The amount of captured particulates was 8 g/L.

Subsequently, the engine was driven at the number of revolutions of 1250 min$^{-1}$ and a torque of 60 Nm, and in a state where the temperature of the filter had become constant, this state was kept for one minute. Thereafter, a post injection process was executed, and the exhaust temperature was raised by utilizing the oxide catalyst present on the front side so that particulates were burned.

The conditions of the post injection were set so that the center temperature of the honeycomb structure became almost constant at 600° C. after a lapse of one minute from the start. After repeating the above-mentioned process 10 times, it was observed whether the crack and the like occurred in the honeycomb structured bodies. Table 2 shows the results.

As clearly shown in the results in Table 2, in the honeycomb structured bodies according to Examples 1 to 5 in which the adhesive strength A between the central portion honeycomb fired bodies was lower than the adhesive strength B between the peripheral portion honeycomb fired bodies, no cracks and the like were observed, even after cycle operation executed. On the contrary, in the honeycomb structured bodies according to Comparative Examples 1 to 4 in which the adhesive strength A between the central portion honeycomb fired bodies was same as or higher than the adhesive strength B between the peripheral portion honeycomb fired bodies, cracks were observed in the adhesive layers.

Second Embodiment

Although the honeycomb fired body having cells in each of which a plug material layer is formed on either one of ends thereof, the honeycomb fired body forming the honeycomb structure may be a honeycomb fired body having cells in which no plug material layer 13c is formed on both ends thereof, unlike the honeycomb fired body 13 shown in FIG. 2A.

The honeycomb structure formed by such a honeycomb fired body is suitably applicable in a catalyst carrier. By allowing an oxide catalyst to be supported on the honeycomb structure formed by the honeycomb fired bodies having cells 13a in each of which a plug material layer 13c is formed on either one of ends thereof, it becomes possible to lower the burning temperature of particulates, so that particulates can be efficiently burned. By allowing a noble metal to be supported thereon, it becomes possible to convert a toxic gas component in exhaust gases such as CO, HC and NOx.

In this case, the catalyst is desirably supported on a catalyst supporting layer after the catalyst supporting layer has been formed.

As the material for forming the catalyst supporting layer, a material having a high specific surface area and capable of supporting the catalyst highly dispersed thereon is desirably used, and examples thereof include oxide ceramics, such as alumina, titania, zirconia, and silica.

Each of these may be used alone, or two or more kinds of these may be used in combination.

Out of these, a material having a specific surface area of about 250 $m^2/g$ or more is desirably used, and γ-alumina is more desirably used.

Although a method for forming the catalyst supporting layer made of alumina is not particularly limited, a method in which honeycomb structure is penetrated in a solution of the metallic compound containing aluminum such as a solution of aluminum nitrate, the cell walls are coated by an alumina film layer by a sol-gel method, and the honeycomb structure is dried and fired may be used.

With respect to the catalyst to be supported on the surface of the catalyst supporting layer, for example, a noble metal such as platinum, palladium and rhodium are desirably used. Out of these, platinum is more desirably used. Moreover, for example, an alkaline metal such as potassium and sodium, and an alkaline-earth metal such as barium may also be used as other catalysts. These catalysts may be used alone, or two or more kinds of these may be used in combination.

Third Embodiment

Figure 5A:
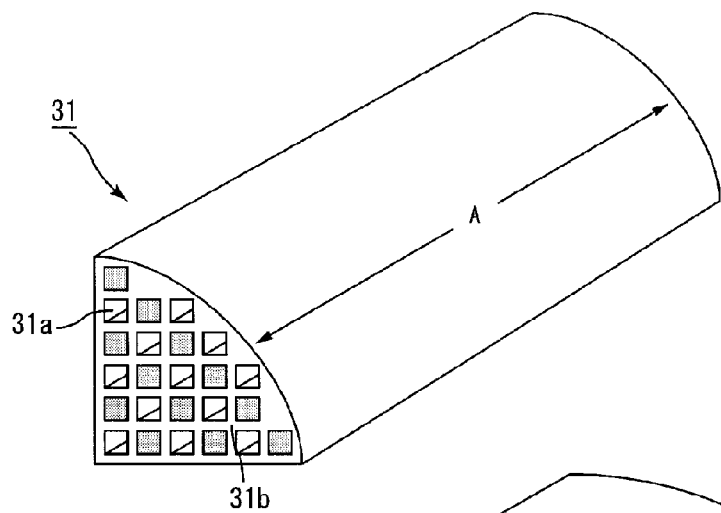
FIGS. 5A, 5B and 5C are perspective views each showing one embodiment of a honeycomb fired body forming the honeycomb structure of the present invention.
Figure 5B:
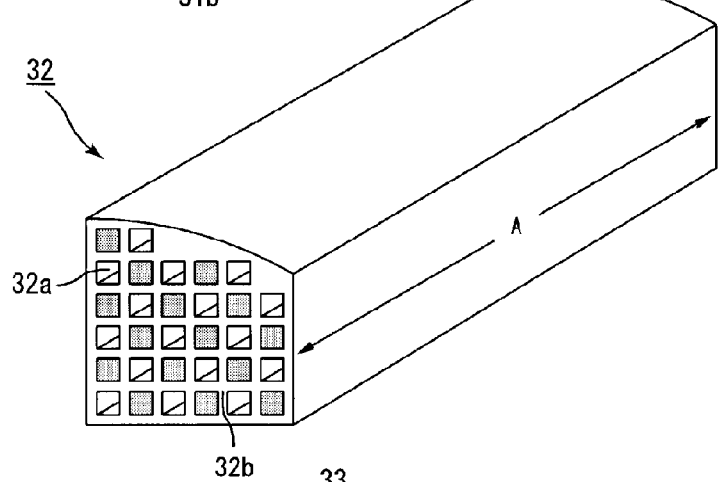
Figure 5C:
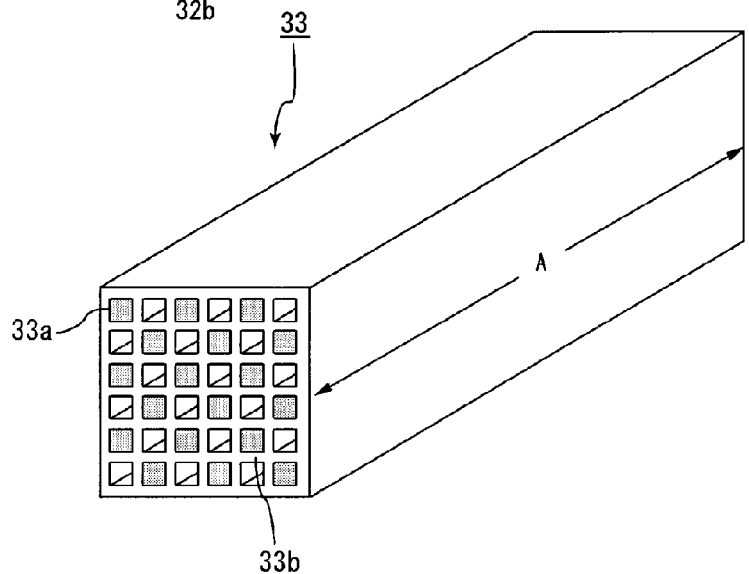

FIGS. 5A, 5B and 5C are perspective views each showing one embodiment of a honeycomb fired body.

In the above-mentioned embodiment, the honeycomb structure 10 is formed by the honeycomb fired bodies 11 to 13 adhered to one another by interposing the adhesive layer 14, has a sealing material layer formed in the periphery thereof (refer to FIG. 1B). However, the honeycomb structure of another embodiment of the present invention may be a honeycomb structure in which an aggregated body is formed by the honeycomb fired bodies 31, 32, and 33 adhered to one another by interposing an adhesive layer as shown in FIGS. 5A, 5B and 5C and the sealing material layer is not formed thereon.

In this case, the honeycomb fired body 31 is equivalent to the honeycomb fired body 11 shown in FIG. 1B and the honeycomb fired body 32 is equivalent to the honeycomb fired body 12. Since the wall part is formed also in a portion corresponding to a periphery, a sealing material layer is not needed in particular.

Moreover, in the honeycomb structure having such a structure, it is not necessary to form the honeycomb structure into a round-pillar shape by cutting process, after manufacturing the laminated body of the honeycomb fired bodies by adhering the honeycomb fired bodies to one another, therefore it is possible to more efficiently manufacture the honeycomb structure.

Even in the case of manufacturing the honeycomb structure using the honeycomb fired bodies 31, 32, and 33, a sealing material layer is formed, if necessary, for a purpose such as to increase the strength of the outer wall.

Other Embodiments

The shape of the honeycomb structure according to the embodiments of the present invention is not limited to a round-pillar shape shown in FIG. 1B, and may be a desired shape such as oval-pillar and polygonal-pillar, as long as it is pillar-shape.

Moreover, like the above-mentioned embodiment, the number of the honeycomb fired bodies forming the honeycomb structure is limited to neither 16 nor 25 pcs, and may be the other number.

The honeycomb structure according to the embodiments of the present invention preferably has a porosity of at least about 30% and at most about 70%.

This is because it is possible to maintain the strength of the above-mentioned honeycomb structure, and also it is easier to keep low resistance upon passage of exhaust gases through the cell wall.

On the contrary, in a case where the porosity is about 30% or more, the cell wall tends not to be clogged in an early stage. On the other hand, in a case where the porosity is about 70% or less, the strength of the honeycomb structure tends not to be reduced and the honeycomb structure becomes less likely to be destroyed.

Here, the porosity and the pore diameter can be measured through a conventionally known method such as a mercury porosimetry, Archimedes method and a measuring method using a scanning electronic microscope (SEM).

Although the cell density of the cross-section perpendicular to the longitudinal direction of the honeycomb structure is not particularly limited, a desirable lower limit thereof is about 31.0 $pcs/cm^2$ (about 200 $pcs/in^2$), and a desirable upper limit thereof is about 93 $pcs/cm^2$ (about 600 $pcs/in^2$). A more desirable lower limit thereof is about 38.8 $pcs/cm^2$ (about 250 $pcs/in^2$), and a more desirable upper limit thereof is about 77.5 $pcs/cm^2$ (about 500 $pcs/in^2$).

The main component of the honeycomb structure (honeycomb fire body) is not particularly limited, and may include other ceramic material: nitride ceramics such as aluminum nitride, silicon nitride, boron nitride and titanium nitride, carbide ceramics such as zirconium carbide, titanium carbide and tantalum carbide, a complex of metal and nitride ceramics, a complex of metal and carbide ceramics, and the like.

In addition, silicon-containing ceramic such as metallic silicon blended with the above-mentioned ceramics and ceramic bound by silicon or silicate compounds can also be used as the constituting material.

In particular, silicon carbide is desirably used as a main component of the constituting materials due to its superior heat resistant property, mechanical strength, thermal conductivity and the like.

Furthermore, ceramics (silicon-containing silicon carbide) in which metallic silicon is blended with silicon carbide are preferably used.

The organic binder used for preparation of the wet mixture is not limited, and examples thereof include carboxymethyl cellulose, hydroxyethyl cellulose, polyethylene glycols and the like. Out of these, methyl cellulose is preferably used. In general, the compounding amount of the above-mentioned binder is desirably set to at least about 1 parts by weight and at most about 10 parts by weight with respect to 100 parts by weight of the inorganic powder.

The plasticizer and lubricous material to be used in preparation of the wet mixture are not limited, and examples of the plasticizer include glycerin and the like. Examples of the lubricant include a polyoxyalkylene series compound such as polyoxyethylene alkyl ether, polyoxypropylene alkyl ether and the like.

Specific examples of the lubricant include polyoxyethylene monobutyl ether, polyoxypropylene monobutyl ether and the like.

Here, the wet mixture may not contain the plasticizer and lubricant, if not necessary.

Moreover, a carrier fluid solution may be used for preparation of the wet mixture, and examples thereof include an organic solvent such as water and benzene and alcohol such as methanol, and the like.

Furthermore, a molding auxiliary may be added to the wet mixture.

The molding auxiliary is not particularly limited, and examples thereof include ethylene glycol, dextrin, fatty acid, fatty acid soap and polyvinyl alcohol and the like.

In addition, a pore-forming agent, such as balloons that are fine hollow spheres composed of oxide-based ceramic materials, spherical acrylic particles and graphite, may be added to the above-mentioned material paste, if necessary.

The above-mentioned balloons are not particularly limited, and examples thereof include alumina balloons, glass microballoons, shirasu balloons, fly ash balloons (FA balloons), mullite balloons and the like. Out of these, alumina balloons are more preferably used.

Moreover, the content of the organic component in the wet mixture is desirably about 10% by weight or less, and the content of water in the wet mixture is desirably at least about 8% by weight and at most about 30% by weight.

Although the sealing material paste is not particularly limited, those sealing material pastes that allow the plugs manufactured through post processes to have a porosity of at least about 30% and at most about 75% are desirably used, and, for example, the same material as that of the wet mixture may be used.

A catalyst can be supported on the honeycomb structure in which either one end of cells is sealed to function as a filter. For this reason, it is possible to obtain the same effect as a catalyst carrier.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A honeycomb structure comprising:
   a plurality of pillar-shaped honeycomb fired bodies bound with one another by interposing an adhesive layer, each of the honeycomb fired bodies having a large number of cells longitudinally placed in parallel with one another with a cell wall therebetween,
   wherein an adhesive strength A between central portion honeycomb fired bodies out of the honeycomb fired bodies measured by a three-point bending strength test is at least about 0.02 and at most about 0.2 MPa, the central portion honeycomb fired bodies being positioned at a central portion of a cross-section formed by cutting the honeycomb structure perpendicularly to the longitudinal direction, and
   wherein the adhesive strength A is lower than an adhesive strength B between peripheral portion honeycomb fired bodies out of the honeycomb fired bodies measured by the three-point bending strength test, the peripheral portion honeycomb fired bodies forming a part of a periphery the honeycomb structure.

2. The honeycomb structure according to claim 1, wherein
a difference between the adhesive strength A between said central portion honeycomb fired bodies measured by the three-point bending strength test and the adhesive strength B between said peripheral portion honeycomb fired bodies measured by the three-point bending strength test is at least about 0.02 and at most about 0.2 MPa.

3. The honeycomb structure according to claim 1, wherein
either one end portion of each of said cells is sealed.

4. The honeycomb structure according to claim 1, wherein
said adhesive layer comprises a combination of inorganic fibers and an inorganic binder, a combination of inorganic particles and the inorganic binder, or a combination of the inorganic fibers, the inorganic particles and the inorganic binder.

5. The honeycomb structure according to claim 1, wherein
an adhesive strength of an adhesive layer between the central portion honeycomb fired body and the peripheral portion honeycomb fired body is same as the adhesive strength A between the central portion honeycomb fired bodies, or same as the adhesive strength B between the peripheral portion honeycomb fired bodies, or in a middle of the adhesive strength A and the adhesive strength B.

6. The honeycomb structure according to claim 1, wherein
the honeycomb structure comprises a ceramic block provided by cutting a peripheral portion of a laminated body of the honeycomb fired bodies, and a sealing material layer formed on the periphery of the ceramic block by using a sealing material paste.

7. The honeycomb structure according to claim 1, wherein
the honeycomb structure comprises honeycomb fired bodies bound to one another by interposing an adhesive layer, each of the honeycomb fired bodies having a wall part in a portion corresponding to the periphery.

8. The honeycomb structure according to claim 1, further comprising:
a catalyst supporting layer, and a catalyst supported on a surface of said catalyst supporting layer.

9. The honeycomb structure according to claim 8, wherein
the catalyst includes a noble metal, an alkali metal, an alkaline-earth metal, or an oxide catalyst.

10. The honeycomb structure according to claim 8, wherein
the catalyst supporting layer comprises alumina, titania, zirconia, or silica.

11. The honeycomb structure according to claim 1, further comprising:
a sealing material layer formed on a periphery of the honeycomb structure.

12. The honeycomb structure according to claim 1, wherein
constituting materials of the honeycomb structure comprise silicon carbide or silicon-containing silicon carbide.

13. The honeycomb structure according to claim 1, wherein
the adhesive layer for adhering all of the central portion honeycomb fired bodies to one another is made of first same materials, and the adhesive layer for adhering all of the peripheral portion honeycomb fired bodies to one another is made of second same materials.

14. The honeycomb structure according to claim 1, wherein
no plug material layer is formed on both ends of the cells of the honeycomb fired bodies.

15. The honeycomb structure according to claim 1, wherein
the plurality of honeycomb fired bodies are adhered to one another by interposing the adhesive layer to form a pillar-shaped aggregated body.

16. The honeycomb structure according to claim 15, wherein
a shape of the pillar-shaped aggregate body is one of a round-pillar shape, an oval-pillar shape, and a polygonal-pillar shape.

17. The honeycomb structure according to claim 1, wherein
the honeycomb structure is manufactured by applying the adhesive paste adjusted to have a predetermined strength onto side faces of a honeycomb fired body to form an adhesive paste layer having a predetermined thickness, repeating the process of applying the adhesive paste to additional honeycomb fired bodies and laminating the additional honeycomb bodies thereon to manufacture a rectangular pillar-shaped laminated body of the honeycomb fired bodies having a predetermined size, and drying the laminated body.

18. The honeycomb structure according to claim 17, wherein
the laminated body is cut to manufacture said honeycomb structure.

* * * * *